United States Patent
Kamio

(10) Patent No.: US 11,736,055 B2
(45) Date of Patent: Aug. 22, 2023

(54) SHIFT RANGE CONTROL DEVICE

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 50 days.

(21) Appl. No.: 17/027,435

(22) Filed: Sep. 21, 2020

(65) Prior Publication Data

US 2021/0006194 A1 Jan. 7, 2021

Related U.S. Application Data

(63) Continuation of application No. PCT/JP2019/011267, filed on Mar. 18, 2019.

(30) Foreign Application Priority Data

Mar. 23, 2018 (JP) ................................. 2018-055990

(51) Int. Cl.
*H02P 29/028* (2016.01)
*H02P 6/28* (2016.01)
(Continued)

(52) U.S. Cl.
CPC ........... *H02P 29/028* (2013.01); *F16H 61/32* (2013.01); *H02P 6/16* (2013.01); *H02P 6/28* (2016.02);
(Continued)

(58) Field of Classification Search
CPC .. H02P 29/028; H02P 6/16; H02P 6/28; H02P 25/22; F16H 61/32; F16H 2061/326
See application file for complete search history.

(56) References Cited

U.S. PATENT DOCUMENTS 5,094,115 A * 3/1992 Michihira .............. B60K 37/06
74/335
7,178,412 B2 * 2/2007 Nallapa ................... G01P 21/02
73/862.326
(Continued)

FOREIGN PATENT DOCUMENTS

JP 2003-97694 4/2003
JP 2003097694 A * 4/2003

OTHER PUBLICATIONS

U.S. Appl. No. 17/016,752, to Kamio, filed Sep. 10, 2020 (27 pages).

*Primary Examiner* — Bickey Dhakal
(74) *Attorney, Agent, or Firm* — Nixon & Vanderhye P.C.

(57) ABSTRACT

A shift range control device is provided for a shift range switching system that includes a motor having winding sets and a motor rotational angle sensor. The shift range control device includes controllers configured to control switching of a shift range by controlling drive of the motor. Each of the controllers is provided to corresponding one of the winding sets, and is configured to acquire a motor rotational angle signal from the motor rotational angle sensor and calculate a motor angle, control drive of the motor by controlling a current supply to the corresponding one of the winding sets to make the motor angle become a target rotational angle corresponding to a target shift range, and drive the motor by sequentially switching a current-supplied phase for each predetermined period without using the motor rotational angle signal when the motor rotational angle signal is in fault.

8 Claims, 6 Drawing Sheets

(51) Int. Cl.
  *F16H 61/32* (2006.01)
  *H02P 6/16* (2016.01)
  *H02P 25/22* (2006.01)

(52) U.S. Cl.
  CPC ........ *H02P 25/22* (2013.01); *F16H 2061/326* (2013.01)

(56) References Cited

U.S. PATENT DOCUMENTS

| | | | | |
|---|---|---|---|---|
| 7,460,030 | B2 * | 12/2008 | Farkas | H03M 1/1076 341/11 |
| 7,511,444 | B2 * | 3/2009 | Nakai | F16H 61/32 180/65.6 |
| 10,680,541 | B2 * | 6/2020 | Kamio | H02P 6/15 |
| 2001/0005816 | A1 * | 6/2001 | Kusafuka | F16H 61/32 702/96 |
| 2004/0008002 | A1 * | 1/2004 | Kamio | H02P 6/12 318/701 |
| 2004/0066166 | A1 * | 4/2004 | Nakai | F16H 59/105 318/701 |
| 2004/0249541 | A1 * | 12/2004 | Kim | F16H 59/105 701/51 |
| 2005/0156550 | A1 * | 7/2005 | Kamio | H02P 25/08 73/1.79 |
| 2005/0174084 | A1 * | 8/2005 | Nakai | F16H 61/32 318/632 |
| 2008/0129236 | A1 * | 6/2008 | Isobe | F16H 63/3466 318/468 |
| 2009/0120222 | A1 * | 5/2009 | Kimura | F16H 63/3416 74/335 |
| 2009/0292431 | A1 * | 11/2009 | Hoshino | F16H 61/12 701/62 |
| 2013/0105623 | A1 * | 5/2013 | Moulon | B64C 13/341 244/99.4 |
| 2013/0110365 | A1 * | 5/2013 | Kimura | F16H 61/12 701/65 |
| 2013/0141031 | A1 * | 6/2013 | Yamada | G05B 19/23 318/603 |
| 2015/0222211 | A1 * | 8/2015 | Maruo | H02P 23/0027 318/612 |
| 2016/0215880 | A1 * | 7/2016 | Kinoshita | F16H 59/66 |
| 2017/0104435 | A1 * | 4/2017 | Nagata | H02P 29/024 |
| 2018/0115262 | A1 * | 4/2018 | Kamio | H02P 6/08 |
| 2019/0097554 | A1 * | 3/2019 | Kamio | H02P 6/15 |
| 2019/0195354 | A1 * | 6/2019 | Kamio | F16H 61/12 |
| 2019/0338851 | A1 * | 11/2019 | Kamio | H02P 23/20 |
| 2020/0412293 | A1 * | 12/2020 | Kamio | H02P 6/16 |

* cited by examiner

FIG. 5

| SIGNAL PATTERN | | | | |
|---|---|---|---|---|
| NUMBER | A-PHASE | B-PHASE | C-PHASE | STATUS |
| (0) | 0 (Lo) | 0 (Lo) | 1 (Hi) | NORMAL |
| (1) | 0 (Lo) | 1 (Hi) | 1 (Hi) | NORMAL |
| (2) | 0 (Lo) | 1 (Hi) | 0 (Lo) | NORMAL |
| (3) | 1 (Hi) | 1 (Hi) | 0 (Lo) | NORMAL |
| (4) | 1 (Hi) | 0 (Lo) | 0 (Lo) | NORMAL |
| (5) | 1 (Hi) | 0 (Lo) | 1 (Hi) | NORMAL |
| (6) | 1 (Hi) | 1 (Hi) | 1 (Hi) | FAULT |
| (7) | 0 (Lo) | 0 (Lo) | 0 (Lo) | FAULT |

SHIFT RANGE CONTROL DEVICE

CROSS REFERENCE TO RELATED APPLICATIONS

The present application is a continuation application of International Patent Application No. PCT/JP2019/011267 filed on Mar. 18, 2019, which designated the U.S. and claims the benefit of priority from Japanese Patent Application No. 2018-055990 filed on Mar. 23, 2018. The entire disclosures of all of the above applications are incorporated herein by reference.

TECHNICAL FIELD

The present disclosure relates to a shift range control device.

BACKGROUND

There has been known a shift range switching apparatus that switches a shift range by controlling a motor.

SUMMARY

The present disclosure provides a shift range control device for a shift range switching system that includes a motor having winding sets and a motor rotational angle sensor. The shift range control device includes controllers configured to control switching of a shift range by controlling drive of the motor. Each of the controllers is provided to corresponding one of the winding sets, and is configured to acquire a motor rotational angle signal from the motor rotational angle sensor and calculate a motor angle, control drive of the motor by controlling a current supply to the corresponding one of the winding sets to make the motor angle become a target rotational angle corresponding to a target shift range, and drive the motor by sequentially switching a current-supplied phase for each predetermined period without using the motor rotational angle signal when the motor rotational angle signal is in fault.

BRIEF DESCRIPTION OF DRAWINGS

Objects, features and advantages of the present disclosure will become apparent from the following detailed description made with reference to the accompanying drawings. In the drawings:

FIG. 5 is a diagram showing encoder patterns according to the embodiment; and

DETAILED DESCRIPTION

Figure 1:
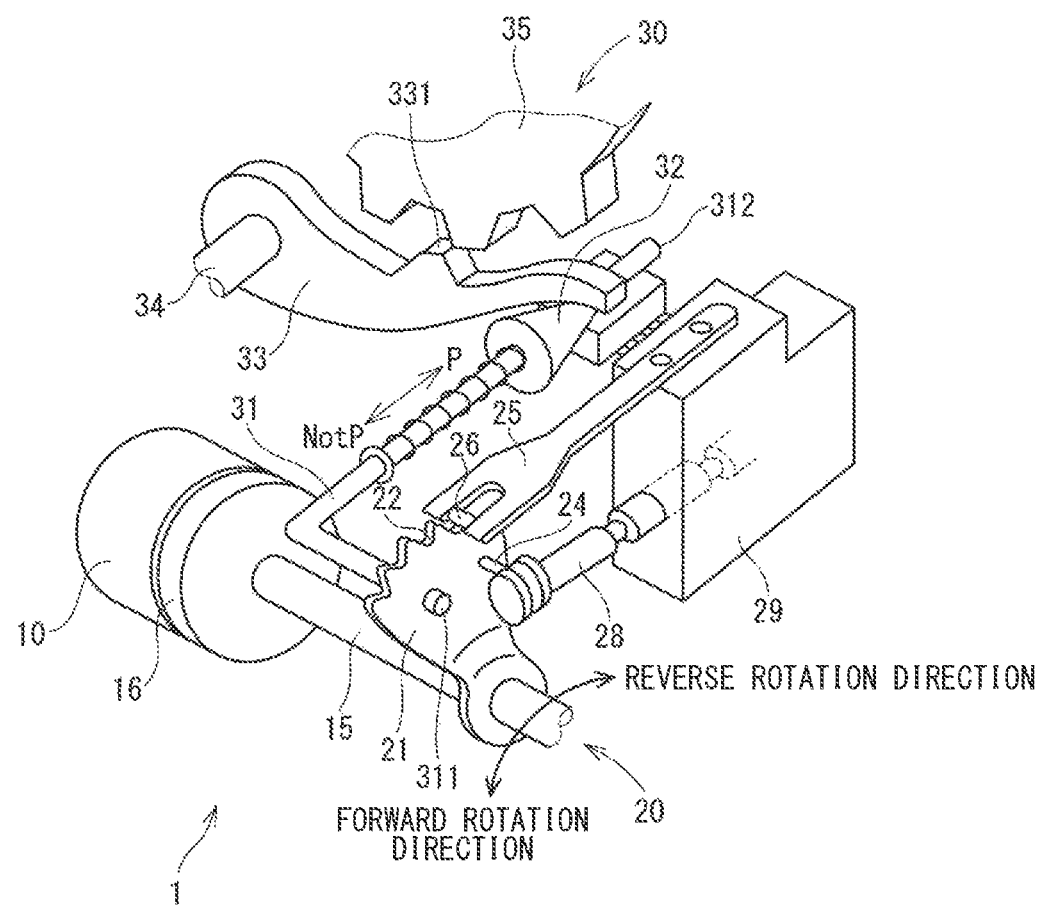
FIG. 1 is a perspective view showing a shift-by-wire system according to an embodiment.

In a shift range switching system, drive of a motor may be controlled using a detection value of an encoder and a detection value of an output shaft sensor. In a case where the shift range switching system includes one each of electronic controller (ECU), encoder, and output shaft sensor, when a fault occurs in the ECU, the encoder, or the output shaft sensor, there is a possibility that the motor cannot be driven and the switching of the shift range cannot be continued. It is conceivable to employ a double system design in order to ensure evacuation traveling performance at an occurrence of a fault. For example, when the encoder is made in the double system and the control is performed based on different detection values, a drive loss might occur due to a detection error.

A shift range control device according to an aspect of the present disclosure is provided for a shift range switching system that includes a motor and a motor rotational angle sensor. The motor has a plurality of winding sets. The motor rotational angle sensor is configured to detect rotation of the motor. The shift range control device includes a plurality of controllers configured to control switching of a shift range by controlling drive of the motor. Each of the controllers is provided to corresponding one of the winding sets. Each of the controllers includes a motor angle calculator and a drive controller. The motor angle calculator is configured to acquire a motor rotational angle signal from the motor rotational angle sensor and calculate a motor angle. The drive controller is configured to control drive of the motor by controlling a current supply to the corresponding one of the winding sets to make the motor angle become a target rotational angle corresponding to a target shift range. When the motor rotational angle signal is in fault, the drive controller in each of the controllers drives the motor by sequentially switching a current-supplied phase for each predetermined period without using the motor rotational angle signal.

A shift range control device according to another aspect of the present disclosure is provided for a shift range switching system that includes a motor and a motor rotational angle sensor. The motor has a plurality of winding sets. The motor rotational angle sensor is configured to detect rotation of the motor. The shift range control device includes a plurality of controllers configured to control switching of a shift range by controlling drive of the motor. Each of the controllers is provided to corresponding one of the winding sets. Each of the controllers includes a processor and a memory. The memory stores instructions configured to, when executed by the processor, cause the processor to acquire a motor rotational angle signal from the motor rotational angle sensor and calculate a motor angle, and control drive of the motor by controlling a current supply to the corresponding one of the winding sets to make the motor angle become a target rotational angle corresponding to a target shift range. The instructions are further configured to, when executed by the processor, cause the processor to drive the motor by sequentially switching a current-supplied phase for each predetermined period without using the motor rotational angle signal when the motor rotational angle signal is in fault.

In the above-described aspects of the present disclosure, since one motor rotational angle signal is shared by the plurality of controllers, the number of components can be reduced and a drive loss caused by a detection error can be reduced as compared to a case where a motor rotational angle sensor is separately provided for each controller. In addition, when the motor rotational angle signal is in fault, the controllers switch a control mode into a control without using the motor rotational angle signal, so that even when the motor rotational angle signal is in fault, the drive of the motor can be continued and evacuation traveling performance can be ensured.

One Embodiment

Hereinafter, a shift range control device according to the present disclosure will be described with reference to the drawings. As shown in FIGS. 1 to 4, a shift-by-wire system 1 as a shift range switching system includes a motor 10 that is an actuator, an encoder 13 as a motor rotational angle sensor, a shift range switching mechanism 20, a parking lock mechanism 30, a shift range control device 40, and the like.

Figure 3:
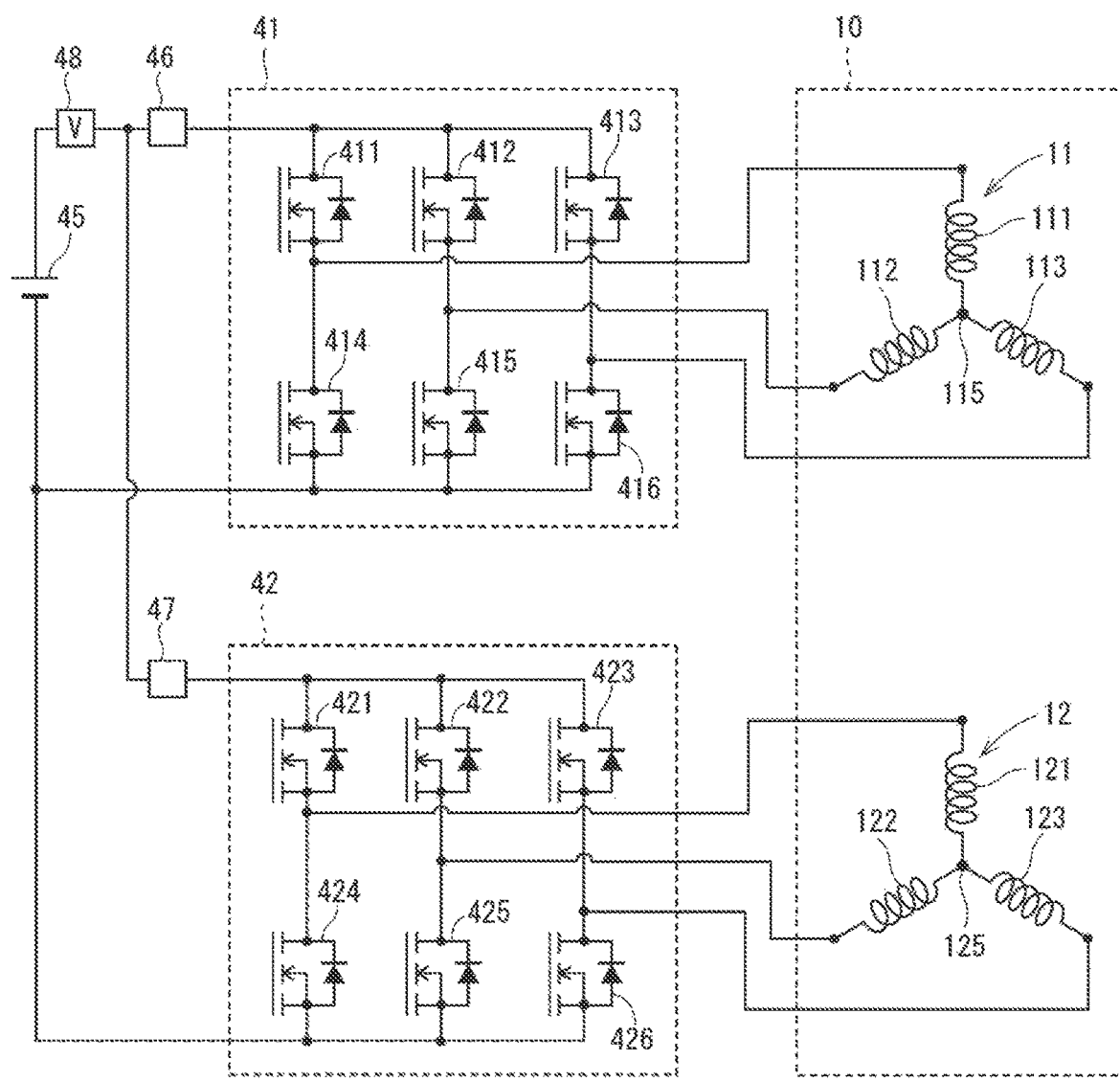
FIG. 3 is a circuit diagram showing a motor and a motor driver according to the embodiment.

The rotor 103 rotates by electric power being supplied from a battery 45 mounted in a vehicle (not shown) to winding sets 11, 12, and the motor 10 functions as a drive source for the shift range switching mechanism 20. The motor 10 of the present embodiment is a permanent magnet-type direct-current (DC) brushless motor. As shown in FIG. 3, the motor 10 has two winding sets 11, 12. A first winding set 11 has a U1 coil 111, a V1 coil 112, and a W1 coil 113. A second winding set 12 has a U2 coil 121, a V2 coil 122, and a W2 coil 123.

Figure 2:
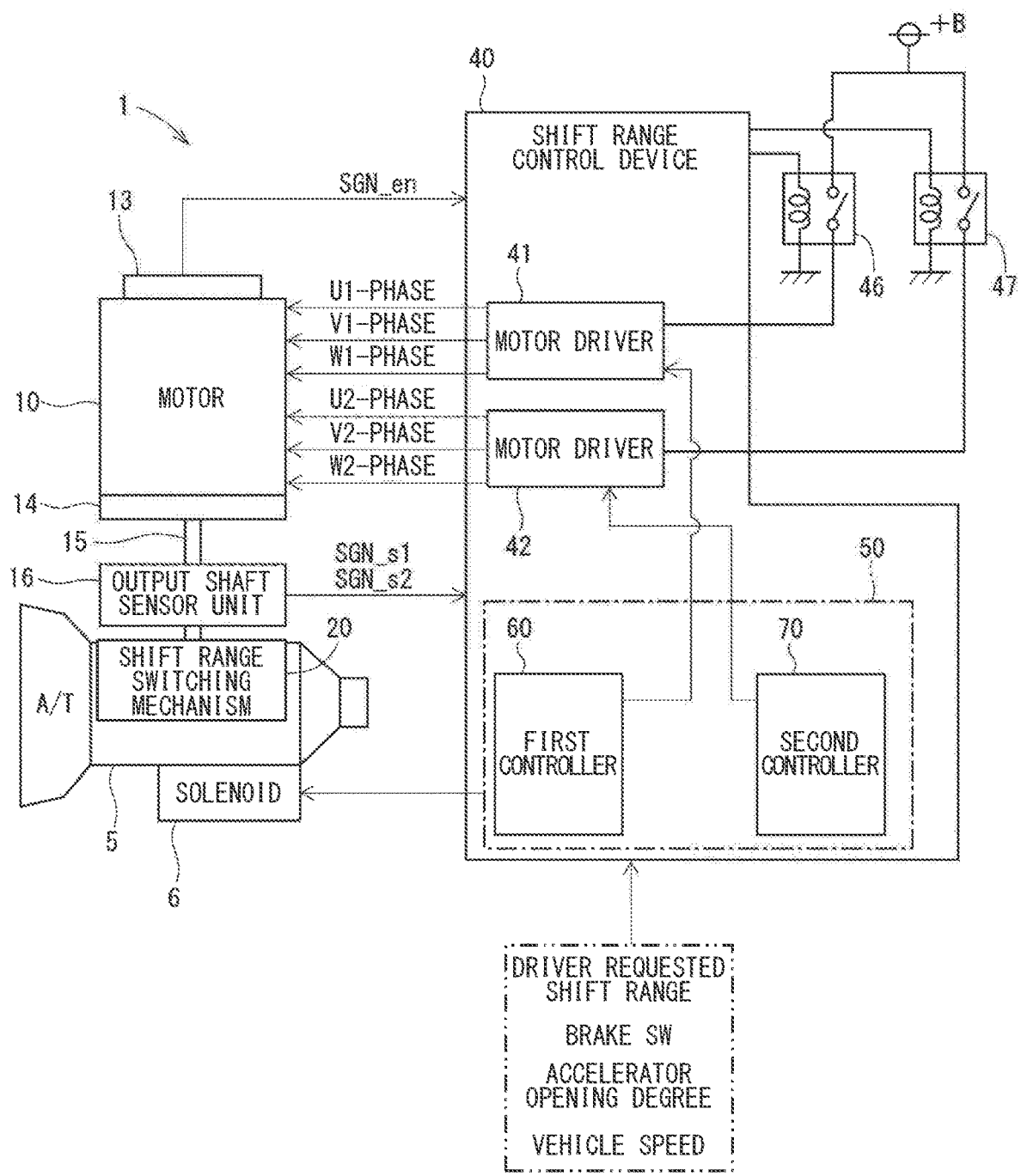
FIG. 2 is a schematic configuration diagram showing the shift-by-wire system according to the embodiment.
Figure 4:
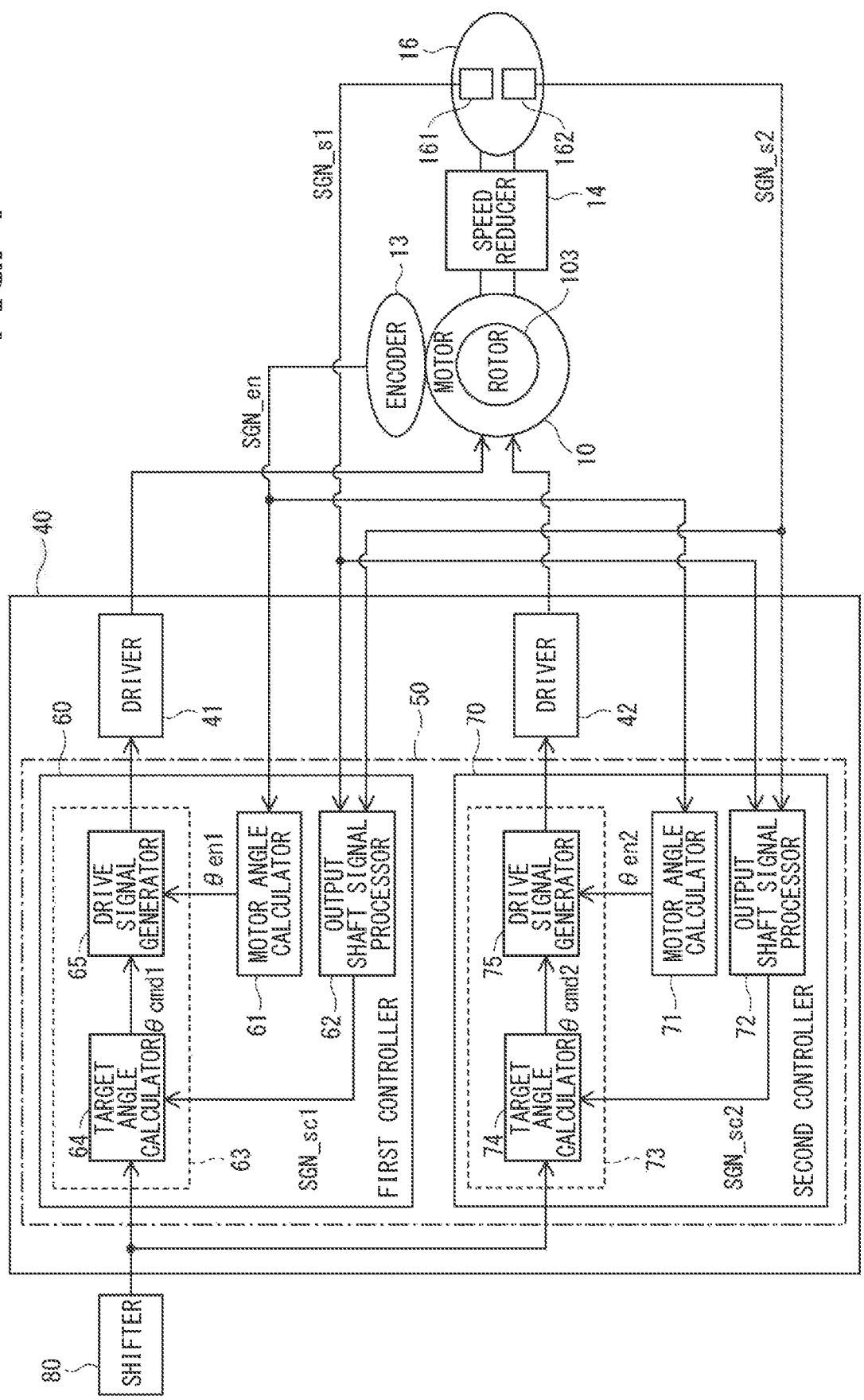
FIG. 4 is a block diagram showing a controller according to the embodiment.

As shown in FIGS. 2 and 4, the encoder 13 detects the rotational position of the rotor 103 of the motor 10. The encoder 13 is, for example, a magnet-type rotary encoder and is made up of a magnet that rotates integrally with the rotor 103, a magnetic detection hall integrated circuit (IC), and the like. The encoder 13 is a three-phase encoder, and outputs A-phase, B-phase, and C-phase pulse signals at predetermined angles, respectively, in synchronization with the rotation of the rotor 103. In addition to the three-phase signals, a Z-phase signal as a reference signal may be output separately. The signal output from the encoder 13 is referred to as an encoder signal SGN_en. In the present embodiment, the encoder signal SGN_en corresponds to a "motor rotational angle signal".

A speed reducer 14 is provided between a motor shaft of the motor 10 and an output shaft 15, decelerates the rotation of the motor 10, and outputs the rotation to the output shaft 15. Thereby, the rotation of the motor 10 is transmitted to the shift range switching mechanism 20. The output shaft 15 is provided with an output shaft sensor unit 16 that detects the angle of the output shaft 15.

The output shaft sensor unit 16 has a first output shaft sensor 161 and a second output shaft sensor 162. The first output shaft sensor 161 detects the rotational position of the output shaft 15 and outputs a first output shaft signal SGN_s1. The second output shaft sensor 162 detects the rotational position of the output shaft 15 and outputs a second output shaft signal SGN_s2. The output shaft sensors 161, 162 are, for example, potentiometers.

As shown in FIG. 1, the shift range switching mechanism 20 includes a detent plate 21, a detent spring 25, and the like and transmits a rotational driving force, output from the speed reducer 14, to a manual valve 28 and the parking lock mechanism 30. The detent plate 21 is fixed to the output shaft 15 and driven by the motor 10. In the present embodiment, a direction in which the detent plate 21 is separated from a base of the detent spring 25 is defined as a forward rotation direction, and a direction in which the detent plate 21 approaches the base is defined as a reverse rotation direction.

The detent plate 21 is provided with a pin 24 that protrudes in parallel with the output shaft 15. The pin 24 is connected to the manual valve 28. The detent plate 21 is driven by the motor 10, whereby the manual valve 28 reciprocates in an axial direction. That is, the shift range switching mechanism 20 converts the rotational motion of the motor 10 into linear motion and transmits the linear motion to the manual valve 28. The manual valve 28 is provided on a valve body 29. A hydraulic pressure supply path to a hydraulic clutch (not shown) is switched by the reciprocation of the manual valve 28 in the axial direction, and the shift range is changed by the switching of the engagement state of the hydraulic clutch.

The detent plate 21 has four concave portions 22 at portions adjacent to the detent spring 25. The concave portions 22 correspond to ranges of D (drive), N (neutral), R (reverse), and P (parking), respectively, from the base side of the detent spring 25. The concave portions 22 holds the manual valve 28 at positions corresponding to the respective ranges.

The detent spring 25 is an elastically deformable plate-like member, and a detent roller 26 is provided at the tip. The detent roller 26 is fitted into any one of the concave portions 22. The detent spring 25 energizes the detent roller 26 toward the revolving center side of the detent plate 21. When a rotational force equal to or more than a predetermined force is applied to the detent plate 21, the detent spring 25 is elastically deformed, and the detent roller 26 moves in the concave portions 22. By the detent roller 26 being fitted into any one of the concave portions 22, a swing of the detent plate 21 is restricted, and the axial position of the manual valve 28 and the state of the parking lock mechanism 30 are determined. Then, the shift range of an automatic transmission 5 is fixed.

The parking lock mechanism 30 includes a parking rod 31, a cone 32, a parking lock pole 33, a shaft portion 34, and a parking gear 35. The parking rod 31 is formed in a substantially L shape, and one end 311 is fixed to the detent plate 21. The cone 32 is provided at the other end 312 of the parking rod 31. The cone 32 is formed so as to decrease in diameter toward the other end 312. When the detent plate 21 swings in the reverse rotation direction, the cone 32 moves in a direction of arrow P.

The parking lock pole 33 is in contact with the conical surface of the cone 32 and is provided so as to be able to swing around the shaft portion 34. The parking lock pole 33 has a protrusion 331 that can be engaged with the parking gear 35. When the detent plate 21 rotates in the reverse rotation direction and the cone 32 moves in the direction of arrow P, the parking lock pole 33 is pushed up, and the protrusion 331 and the parking gear 35 engage with each other. On the other hand, when the detent plate 21 rotates in the forward rotation direction and the cone 32 moves in a direction of arrow not-P, the engagement between the protrusion 331 and the parking gear 35 is released.

The parking gear 35 is provided on an axle (not shown) and is provided so as to be able to engage with the protrusion 331 of the parking lock pole 33. When the parking gear 35 and the protrusion 331 engage with each other, the rotation of the axle is restricted. When the shift range is a not-P range that is a range except for P, the parking gear 35 is not locked by the parking lock pole 33, and the rotation of the axle is not hindered by the parking lock mechanism 30. When the shift range is a P range, the parking gear 35 is locked by the parking lock pole 33, and the rotation of the axle is restricted.

As shown in FIGS. 2 and 4, the shift range control device 40 includes motor drivers 41, 42, an ECU 50, and the like. As shown in FIG. 3, the motor driver 41 is a three-phase inverter that switches the current supply to the first winding set 11, and the switching elements 411 to 416 are bridge-connected. One end of the U1 coil 111 is connected to a connection point of a pair of U-phase switching elements 411, 414. One end of the V1 coil 112 is connected to a connection point between the V-phase switching elements 412, 415 that form a pair. One end of the W1 coil 113 is connected to a connection point of a pair of W-phase switching elements 413, 416. The other ends of the coils 111 to 113 are connected at a connection portion 115.

The motor driver 42 is a three-phase inverter that switches the current supply to the second winding set 12, and the switching elements 421 to 426 are bridge-connected. One end of the U2 coil 121 is connected to a connection point of a pair of U-phase switching elements 421, 424. One end of the V2 coil 122 is connected to a connection point of a pair of the V-phase switching elements 422, 425. One end of the W2 coil 123 is connected to a connection point of a pair of W-phase switching elements 423, 426. The other ends of the coils 121 to 123 are connected at a connection portion 125. The switching elements 411 to 416 and 421 to 426 of the present embodiment are MOSFETs, but other elements such as insulated gate bipolar transistors (IGBTs) may be used.

A motor relay 46 is provided between the motor driver 41 and the battery 45. A motor relay 47 is provided between the motor driver 42 and the battery 45. The motor relays 46, 47 are turned on when a start switch such as an ignition switch is on, and electric power is supplied to the motor 10. By turning off the motor relays 46 and 47, the electric power supply to the motor 10 is stopped. On the high potential side of the battery 45, a voltage sensor 48 for detecting a battery voltage is provided.

As shown in FIGS. 2 and 4, the ECU 50 has a first controller 60 and a second controller 70. Each of the first controller 60 and the second controller 70 is made up mainly of a microcomputer or the like and internally includes a central processing unit (CPU), a read-only memory (ROM), a random-access memory (RAM), an input/output (I/O) (not shown), a bus line that connects these constituents, and the like. Each processing in the ECU 50 may be software processing performed by the CPU executing a program stored in advance in a tangible memory device (i.e., a readable non-transitory tangible recording medium) such as a ROM, or may be hardware processing performed by a dedicated electronic circuit.

The ECU 50 controls the switching of the shift range by controlling the drive of the motor 10 based on a shift signal corresponding to the driver requested shift range which is acquired from a shifter 80, a signal from a brake switch, a vehicle speed, and the like. Further, the ECU 50 controls the drive of a transmission hydraulic control solenoid 6 based on the vehicle speed, an accelerator opening degree, a driver requested shift range, and the like. A gear stage is controlled by controlling the transmission hydraulic control solenoid 6. The transmission hydraulic control solenoids 6 are provided in number in accordance with the number of gear stages, or the like. In the present embodiment, one ECU 50 controls the drive of the motor 10 and the solenoid 6, but a motor ECU for controlling the motor 10 and an automatic transmission (AT)-ECU for controlling the solenoid may be separated. Hereinafter, the drive control for the motor 10 will be mainly described.

As shown in FIG. 4, the first controller 60 and the second controller 70 acquire encoder signals SGN_en output from the encoder 13. Further, the first controller 60 and the second controller 70 acquire the output shaft signals SGN_s1, SGN_s2 from the output shaft sensor unit 16. That is, in the present embodiment, the controllers 60, 70 acquire the encoder signals SGN_en from one encoder 13 and acquire the output shaft signals SGN_s1, SGN_s2 from the two output shaft sensors 161, 162.

The first controller 60 includes a motor angle calculator 61, an output shaft signal processor 62, a drive controller 63, and the like. The second controller 70 includes a motor angle calculator 71, an output shaft signal processor 72, a drive controller 73, and the like. Since the control in the second controller 70 is the same as that in the first controller 60, the processing in the first controller 60 will be mainly described below, and the description of the second controller 70 will be omitted as appropriate.

The motor angle calculator 61 acquires the encoder signal SGN_en from the encoder 13 and calculates the encoder count value θen1. The motor angle calculator 71 acquires the encoder signal SGN_en from the encoder 13 and calculates the encoder count value θen2. Specifically, the motor angle calculators 61, 71 count up or down the encoder count values θen1, θen2 in accordance with the signal pattern for each of pulse edges of the A-phase, B-phase, and C-phase signals included in the encoder signals SGN_en. In the present embodiment, since the motor angle calculators 61, 71 use the encoder signals SGN_en that are the same signal, the calculated encoder count values θen1, θen2 have the same value. In the present embodiment, the encoder count values θen1, θen2 correspond to "motor angles".

The output shaft signal processor 62 acquires the output shaft signals SGN_s1, SGN_s2 from the output shaft sensor unit 16 and determines the calculation output shaft signal SGN_sc1. The output shaft signal processor 72 acquires the output shaft signals SGN_s1, SGN_s2 from the output shaft sensor unit 16 and determines the calculation output shaft signal SGN_sc2.

In the present embodiment, when the output shaft signal SGN_s1 is normal, the output shaft signal processors 62, 72 preferentially use the first output shaft signal SGN_s1 and set the calculation output shaft signals SGN_sc1, SGN_sc2 to be the first output shaft signal SGN_s1. When the first output shaft signal SGN_s1 is in fault and the second output shaft signal SGN_s2 is normal, the calculation output shaft signals SGN_sc1, SGN_sc1 are set to be the second output shaft signal SGN_s2. As a result, the calculation output shaft signals SGN_sc1, SGN_sc2 have the same value. Note that the calculation output shaft signals SGN_sc1, SGN_sc2 only need to have the same value, and thus, for example, calculation values using the output shaft signals SGN_s1, SGN_s2 such as an average value may be used.

When both the output shaft signals SGN_s1, SGN_s2 are out of the normal range, and when the errors of the output shaft signals SGN_s1, SGN_s2 are more than an error determination threshold and it is not possible to specify which is normal, the drive of the motor 10 is stopped.

The drive controller 63 has a target angle calculator 64 and a drive signal generator 65. The drive controller 73 has a target angle calculator 74 and a drive signal generator 75. The target angle calculator 64 calculates a target count value θcmd1 for stopping the motor 10 based on the target shift range and the calculation output shaft signal SGN_sc1. The target angle calculator 74 calculates a target count value θcmd2 for stopping the motor 10 based on the target shift range and the calculation output shaft signal SGN_sc2. Since the calculation output shaft signals SGN_sc1, SGN_sc2 have the same value, the calculated target count values θcmd1, θcmd2 have the same value. In the present embodiment, the target count values θcmd1, θcmd2 correspond to "target rotational angles".

The drive signal generator 65 generates a drive signal for turning on and off the switching elements 411 to 416 by feedback control or the like so that the encoder count value θen1 becomes the target count value θcmd1. Thereby, the current supply to the first winding set 11 is controlled. The drive signal generator 75 generates a drive signal for controlling the on-off operation of the switching elements 421 to 426 by feedback control or the like so that the encoder count value θen2 becomes the target count value θcmd2. Thereby, the current supply to the second winding set 12 is controlled. The drive controllers 63, 73 control the drive of the motor 10 by controlling the current supply to the winding sets 11, 12. That is, in the present embodiment, the drive of the motor 10, which is one actuator, is controlled by the two controllers 60, 70. The detail of the drive control for the motor 10 may be anything.

In the present embodiment, a combination of the first winding set 11 and the driver 41 and the first controller 60 that are related to the current-supply control of the first winding set 11 is defined as a first system. A combination of the second winding set 12 and the driver 42 and the second controller 70 related to the current-supply control of the second winding set 12 is defined as a second system. Further, in the present embodiment, two each of configurations related to the current-supply control of the motor 10 are provided, and the drive of the motor 10 is controlled by double-system parallel control.

FIG. 5 shows signal patterns of the encoder signal SGN_en. In FIG. 5, numbers (0) to (7) are pattern numbers indicating signal patterns. In the drawing, a state where the signal of each phase is Lo is described as "0 (Lo)", and a state where the signal is Hi is described as "1 (Hi)".

A signal pattern in which the A-phase signal and the B-phase signal are Lo and the C-phase signal is Hi is defined as a pattern (0). A signal pattern in which the A-phase signal is Lo and the B-phase signal and the C-phase signal are Hi is defined as a pattern (1). A signal pattern in which the A-phase signal and the C-phase signal are Lo and the B-phase signal is Hi is defined as a pattern (2). A signal pattern in which the A-phase signal and the B-phase signal are Hi and the C-phase signal is Lo is defined as a pattern (3). A signal pattern in which the A-phase signal is Hi and the B-phase signal and the C-phase signal are Lo is defined as a pattern (4). A signal pattern in which the A-phase signal and the C-phase signal are Hi and the B-phase signal is Lo is defined as a pattern (5).

The patterns (0) to (5) are normal patterns, and at the time of rotating the motor 10, the current-supplied phase is switched in accordance with the signal pattern at every edge interrupt of an encoder signal SGN_en from the encoder 13. In the case of a three-phase encoder system, the current-supplied phase is uniquely determined for the signal pattern.

A signal pattern in which the A-phase signal, the B-phase signal, and the C-phase signal are all Hi is defined as a pattern (6), and a signal pattern in which the A-phase signal, the B-phase signal, and the C-phase signal are all Lo is defined as a pattern (7). The pattern (6) in which the A-phase signal, the B-phase signal, and the C-phase signal are all Hi and the pattern (7) in which the phase signals are all Lo are fault patterns that do not occur in a normal state.

In the present embodiment, the current-supplied phase is switched based on the encoder signal SGN_en. Therefore, for example, when two encoders are provided and a signal from one encoder is used in the first controller 60 while a signal from the other encoder is used in the second controller 70, due to variations in the detected value or the like, a gap might occur in switching timing for the current-supplied phase between the first system and the second system to cause occurrence of a drive loss.

Therefore, in the present embodiment, the encoder 13 is not multiplexed, and the controllers 60, 70 commonly use the encoder signal SGN_en from one encoder 13, so that a gap in switching timing for the current-supplied phase does not occur. When the encoder signal SGN_en is in fault, the drive of the motor 10 is continued by open control for driving the motor 10 without using the encoder signal SGN_en, thereby ensuring the evacuation traveling performance. In the open control, the motor 10 is rotated without using the encoder count values θen1, θen2 by sequentially switching the current-supplied phase at predetermined time intervals.

Figure 6:
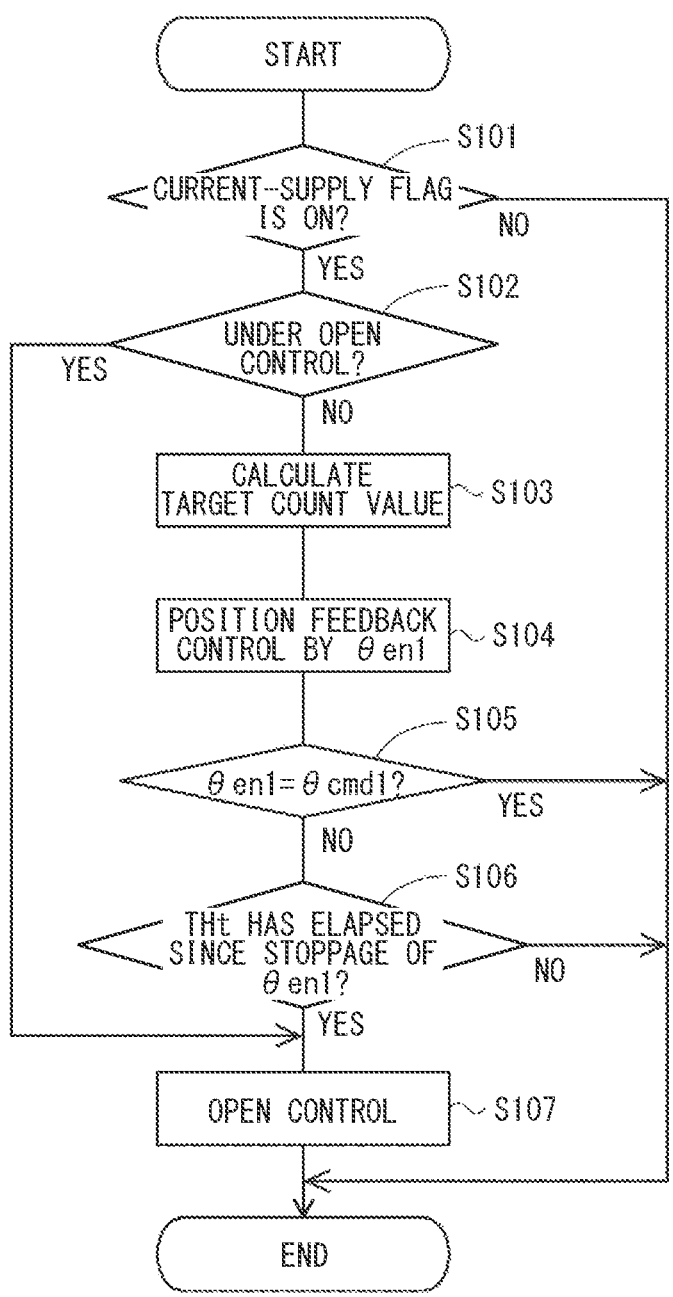
FIG. 6 is a flowchart for explaining a motor drive processing according to the embodiment.

A motor control processing of the present embodiment will be described based on a flowchart of FIG. 6. This processing is performed by the controllers 60, 70 at a predetermined cycle. Here, the control by the first controller 60 will be described. The encoder count value θen2, the calculation output shaft signal SGN_sc2, and the target count value θcmd2 may be used for the processing in the second controller 70 instead of the encoder count value θen1, the calculation output shaft signal SGN_sc1, and the target count value θcmd1.

In S101, the first controller 60 determines whether a current-supply flag has been turned on. In the present embodiment, the current-supply flag is turned on when the target shift range is switched, and the current-supply flag is turned off when the range switching is completed. When it is determined that the current-supply flag is off (S101: NO), the present routine is terminated without performing the processing of S102 and thereafter. When it is determined that the current-supply flag is on (S101: YES), the processing proceeds to S102.

In S102, the first controller 60 determines whether the open control is being performed. When it is determined that the open control is being performed (S102: YES), the processing proceeds to S107 and the open control is continued. When it is determined that the open control is not being performed (S102: NO), the processing proceeds to S103.

In S103, the target angle calculator 64 calculates the target count value θcmd1 by using the calculation output shaft signal SGN_sc1. In S104, the drive signal generator 65 generates a drive signal related to the drive of the motor 10 by position feedback control so that the encoder count value θen1 matches the target count value θcmd1.

In S105, the first controller 60 determines whether the encoder count value θen1 matches the target count value θcmd1. Here, when the encoder count value θen1 is within a control range including the target count value θcmd1 (e.g., ±2 counts), it is considered that the encoder count value θen1 matches the target count value θcmd1. When it is determined that the encoder count value θen1 matches the target count value θcmd1 (S105: YES), the processing shifts to fixed-phase current-supply control that stops the motor 10 by supplying current to the fixed phase. When a predetermined time has elapsed from the start of the fixed-phase current-supply control, the current supply to the motor 10 is terminated, and the current-supply flag is turned off. When it is determined that the encoder count value θen1 does not match the target count value θcmd1 (S105: NO), the processing proceeds to S106.

In S106, the first controller 60 determines whether the fault determination time THt has elapsed since the stoppage of the encoder count value θen1. When it is determined that the encoder count value θen1 has not stopped or that the encoder count value θen1 is within a fault determination time THt after the stoppage (S106: NO), the processing of S107 is not performed, and the present routine is terminated. When it is determined that the fault determination time THt has elapsed since the stoppage of the encoder count value θen1 (S106: YES), it is determined that the encoder signal SGN_en is in fault, and the processing proceeds to S107. In S107, the drive signal generator 65 switches to open control for driving the motor 10 without using the encoder count value θen1.

In the present embodiment, since the winding sets 11, 12, the output shaft sensors 161, 162, and the controllers 60, 70 are duplexed, even when a fault has occurred in a part of the winding sets 11, 12, the output shaft sensors 161, 162, and the controllers 60, 70, the switching of the shift range can be continued. Further, when the encoder signal SGN_en is in fault, the shift range can be switched by continuing the drive of the motor 10 under the open control not using the encoder signal SGN_en, and the evacuation traveling performance can be ensured.

In the present embodiment, since the controllers 60, 70 commonly acquire the encoder signal SGN_en from one encoder 13, the encoder count values θen1, θen2 calculated by the motor angle calculators 61, 71 are the same value. Therefore, the outputs of the encoder count values θen1, θen2 change at the same rotor angle, and hence there is no gap in the current-supply switching timing between the first system and the second system, and a drive loss can be reduced. Further, the number of components can be reduced as compared to a case where the encoder is provided for each of the controllers 60, 70.

As described above, in the shift-by-wire system 1 provided with the motor 10 having the plurality of winding sets 11, 12, and one encoder 13 that detects the rotation of the motor 10, the shift range control device 40 of the present embodiment includes the plurality of controllers 60, 70 that are provided corresponding to the winding sets 11, 12 and control the switching of the shift range by controlling the drive of the motor 10.

The first controller 60 includes the motor angle calculator 61 and the drive controller 63. The second controller 70 includes the motor angle calculator 71 and the drive controller 73. The motor angle calculators 61, 71 acquire the encoder signals SGN_en from the encoder 13 and calculate the encoder count values θen1, θen2. The drive controller 63 controls the drive of the motor 10 by controlling the current supply to the first winding set 11 provided corresponding to the first controller 60 so that the encoder count value θen1 becomes the target count value θcmd1 corresponding to the target shift range. The drive controller 73 controls the drive of the motor 10 by controlling the current supply to the second winding set 12 provided corresponding to the second controller 70 so that the encoder count value θen2 becomes the target count value θcmd2 corresponding to the target shift range.

When the encoder signal SGN_en is in fault, the drive controllers 63, 73 in the plurality of controllers 60, 70 drive the motor 10 by sequentially switching the current-supplied phase for each predetermined period without using the encoder signal SGN_en.

In the present embodiment, since the winding sets 11, 12 and the controllers 60, 70 have been multiplexed, even when a fault partially occurs, the drive control for the motor 10 can be continued and the shift range can be switched. Hence it is possible to ensure evacuation traveling performance.

In the present embodiment, since one encoder signal SGN_en is shared by the plurality of controllers 60, 70, the number of components can be reduced and a drive loss caused by a detection error can be reduced as compared to a case where the encoder 13 is separately provided for each system. Further, when the encoder signal SGN_en in in fault, by switching to control without using the encoder signal SGN_en, the drive of the motor 10 can be continued even when the encoder signal SGN_en is in fault.

The shift-by-wire system 1 includes a plurality of output shaft sensors 161, 162 that detect the rotation of the output shaft 15 to which the rotation of the motor 10 is transmitted. The controllers 60, 70 include the output shaft signal processors 62, 72 that acquire the output shaft signals SGN_s1, SGN_s2 from the plurality of output shaft sensors 161, 162, and determine the calculation output shaft signals SGN_sc1, SGN_sc2 having the same value in the plurality of controllers 60, 70 based on the acquired plurality of output shaft signals SGN_s1, SGN_s2. The target count values θcmd1, θcmd2 are determined based on the calculation output shaft signals SGN_sc1, SGN_sc2. Thereby, even when a fault has occurred in one of the output shaft sensors 161, 162, the target count values θcmd1, θcmd2 can be appropriately set, so that the drive of the motor 10 can be accurately controlled even during the evacuation traveling.

When the encoder count values θen1, θen2 and the target count values θcmd1, θcmd2 do not match and the encoder count values θen1, θen2 do not change over the fault determination time THt during the shift range switching, the controllers 60, 70 determine that the encoder signal SGN_en is in fault. As a result, the fault of the encoder signal SGN_en can be detected appropriately.

Other Embodiments

In the above embodiment, two each of controllers, output shaft sensors, and winding sets are provided, and the configuration related to the motor drive control is duplexed. In another embodiment, three each of controllers, output shaft sensors, and winding sets may be provided to multiplex the configuration.

In the above embodiment, the motor rotational angle sensor is the three-phase encoder. In another embodiment, the motor rotational angle sensor may be a two-phase encoder, or is not limited to the encoder, and any other devices such as a resolver may be used. In the above embodiment, the output shaft sensor is the potentiometer. In another embodiment, the output shaft sensor may be a magnetic sensor, is not limited to one in which a value changes continuously, and may be one in which a value changes stepwise. The output shaft sensor may be configured by a switch that is turned on and off in an angle range corresponding to each range.

In the above embodiment, the motor is the permanent magnet-type three-phase brushless motor. In another embodiment, any motor may be used, such as a switched reluctance (SR) motor. In the above embodiment, the detent plate is provided with four concave portions. In another embodiment, the number of concave portions is not limited to four but may be any number. For example, the number of concave portions in the detent plate may be two, and the P range and the not-P range may be switched. Further, the shift range switching mechanism, the parking lock mechanism, and the like may be different from those in the above embodiment.

In the above embodiment, the speed reducer is provided between the motor shaft and the output shaft. Although the detail of the speed reducer is not mentioned in the above embodiment, the speed reducer may have any configuration, such as one using a cycloid gear, a planetary gear, or a spur gear that transmits a torque from a speed reduction mechanism substantially coaxial with the motor shaft to the drive shaft, and one using these gears in combination. In another embodiment, the speed reducer between the motor shaft and the output shaft may be omitted, or a mechanism except for the speed reducer may be provided. As mentioned above, the present disclosure is not limited to the above embodiments but can be implemented in various forms in the scope not deviating from its gist.

The controller and the technique according to the present disclosure may be achieved by a dedicated computer provided by constituting a processor and a memory programmed to execute one or more functions embodied by a computer program. Alternatively, the controller and the technique according to the present disclosure may be achieved by a dedicated computer provided by constituting a processor with one or more dedicated hardware logic circuits. Alternatively, the controller and the technique according to the present disclosure may be achieved using one or more dedicated computers constituted by a combination of the processor and the memory programmed to execute one or more functions and the processor with one or more hardware logic circuits. Further, the computer program may store a computer-readable non-transitional tangible recording medium as an instruction to be executed by the computer.

What is claimed is:

1. A shift range control device for a shift range switching system that includes a motor and a motor rotational angle sensor, the motor having a plurality of winding sets, the motor rotational angle sensor configured to detect rotation of the motor, the shift range control device comprising:
   a plurality of controllers configured to control switching of a shift range by controlling drive of the motor, wherein
   each of the controllers is provided to corresponding one of the winding sets,
   each of the controllers includes:
      a motor angle calculator configured to acquire a motor rotational angle signal from the motor rotational angle sensor and calculate a motor angle; and
      a drive controller configured to control drive of the motor by controlling a current supply to the corresponding one of the winding sets to make the motor angle become a target rotational angle corresponding to a target shift range,
   when the motor rotational angle signal is in fault, the drive controller in each of the controllers drives the motor by sequentially switching a current-supplied phase for each predetermined period without using the motor rotational angle signal; and
   the shift range switching system further includes a plurality of output shaft sensors each of which is configured to detect a rotational position of an output shaft to which the rotation of the motor is transmitted,
   each of the controllers further includes an output shaft signal processor configured to acquire the output shaft signals from the output shaft sensors and determine, based on the output shaft signals, a calculation output shaft signal having a same value between the controllers, and
   the drive controller in each of the controllers is further configured to calculate the target rotational angle using the calculation output shaft signal.

2. The shift range control device according to claim 1, wherein
   when the motor angle and the target rotational angle do not match and the motor angle does not change over a fault determination time during shift range switching, each of the controllers determines that the motor rotational angle signal is in fault.

3. The shift range control device according to claim 1, wherein
   each of the controllers are configured to commonly use the motor rotational angle signal;
   when the motor rotational angle signal is in fault, the drive of the motor is continued by open control for driving the motor without using the motor rotational angle signal; and
   in the open control, the motor is rotated without using the calculated motor angle by sequentially switching the current-supplied phase.

4. The shift range control device according to claim 1, wherein
   the motor rotational angle sensor is a single encoder different from the plurality of output shaft sensors, and
   the motor angle calculator in each of the controllers acquires the motor rotational angle signal output from the single encoder.

5. A shift range control device for a shift range switching system that includes a motor and a motor rotational angle sensor, the motor having a plurality of winding sets, the motor rotational angle sensor configured to detect rotation of the motor, the shift range control device comprising:
   a plurality of controllers configured to control switching of a shift range by controlling drive of the motor, wherein
   each of the controllers is provided to corresponding one of the winding sets,
   each of the controllers includes a processor and a memory,
   the memory stores instructions configured to, when executed by the processor, cause the processor to:
      acquire a motor rotational angle signal from the motor rotational angle sensor and calculate a motor angle;
      control drive of the motor by controlling a current supply to the corresponding one of the winding sets to make the motor angle become a target rotational angle corresponding to a target shift range; and
      drive the motor by sequentially switching a current-supplied phase for each predetermined period without using the motor rotational angle signal when the motor rotational angle signal is in fault, wherein
   the shift range switching system further includes a plurality of output shaft sensors each of which is configured to detect a rotational position of an output shaft to which the rotation of the motor is transmitted,
   the instructions stored in the memory are further configured to, when executed by the processor, cause the processor to:
      acquire the output shaft signals from the output shaft sensors and determine, based on the output shaft signals, a calculation output shaft signal having a same value between the controllers; and
      calculate the target rotational angle using the calculation output shaft signal.

6. The shift range control device according to claim 5, wherein
   when the motor angle and the target rotational angle do not match and the motor angle does not change over a fault determination time during shift range switching, each of the controllers determines that the motor rotational angle signal is in fault.

7. The shift range control device according to claim 5, wherein
   each of the controllers are configured to commonly use the motor rotational angle signal;

when the motor rotational angle signal is in fault, the drive of the motor is continued by open control for driving the motor without using the motor rotational angle signal; and in the open control, the motor is rotated without using the calculated motor angle by sequentially switching the current-supplied phase.

8. The shift range control device according to claim 5, wherein the motor rotational angle sensor is a single encoder different from the plurality of output shaft sensors, and the memory in each of the controllers further stores instructions configured to, when executed by the processor, cause the processor to acquire the motor rotational angle signal output from the single encoder.

* * * * *